US006433934B1

(12) United States Patent
Reznichenko et al.

(10) Patent No.: US 6,433,934 B1
(45) Date of Patent: Aug. 13, 2002

(54) ILLUMINATION SYSTEM FOR USE IN IMAGING SYSTEMS

(76) Inventors: Yakov Reznichenko, 24 Vanworth Path, Newton, MA (US) 02459; Vladimir Davydenko, Fine Frau 11; Vitalij Lissotchenko, Tospelliweg 19, both of 44149 Dortmund (DE)

( * ) Notice: Subject to any disclaimer, the term of this patent is extended or adjusted under 35 U.S.C. 154(b) by 0 days.

(21) Appl. No.: 09/637,417

(22) Filed: Aug. 11, 2000

(51) Int. Cl.$^7$ ................................................ G02B 27/10

(52) U.S. Cl. ........................ 359/622; 359/621; 359/623

(58) Field of Search ................................ 359/619, 621, 359/622, 623, 625, 626

(56) References Cited

U.S. PATENT DOCUMENTS

| | | | | |
|---|---|---|---|---|
| 4,413,270 A | | 11/1983 | Sprague | 347/258 |
| 4,428,647 A | | 1/1984 | Sprague et al. | 359/20 |
| 4,638,334 A | | 1/1987 | Burnham et al. | 347/239 |
| 4,786,918 A | | 11/1988 | Thorton et al. | 347/239 |
| 4,804,975 A | | 2/1989 | Yip | 347/258 |
| 4,826,269 A | | 5/1989 | Streifer et al. | 359/19 |
| 5,049,901 A | | 9/1991 | Gelbart | 347/239 |
| 5,132,723 A | | 7/1992 | Gelbart | 355/40 |
| 5,521,748 A | | 5/1996 | Sarraf | 359/321 |
| 5,861,992 A | | 1/1999 | Gelbart | 359/619 |
| 5,900,981 A | | 5/1999 | Oren et al. | 359/619 |
| 5,969,872 A | | 10/1999 | Ben Oren et al. | 359/621 |
| 5,986,819 A | | 11/1999 | Steinblatt | 359/663 |
| 6,005,717 A | * | 12/1999 | Neuberger et al. | 359/619 |
| 6,044,096 A | * | 3/2000 | Wolak et al. | 372/36 |
| 6,240,116 B1 | * | 5/2001 | Lang et al. | 372/50 |

FOREIGN PATENT DOCUMENTS

| | | |
|---|---|---|
| WO | WO 99/57791 | 11/1999 |

* cited by examiner

*Primary Examiner*—Ricky Mack
(74) *Attorney, Agent, or Firm*—William E. Hilton; Robert A. Sabourin

(57) ABSTRACT

The invention provides an improved illumination system for use in imaging systems that may produce a non-overlapped near field image in the slow axis direction, and a far field image of the illumination source in the slow axis direction at a light modulator. In an embodiment, the illumination system produces an area of illumination for a light modulator along a slow axis direction and along a fast axis direction, and includes a plurality of laser diode emitters, a first array of first micro lenses, and a second array of second micro lenses. The plurality of laser diode emitters are arranged in an array, and each of the laser diode emitters produces illumination in a slow axis direction and in a fast axis direction. Each first micro lens in the first array corresponds to one of the laser diode emitters, and collimates illumination in the slow axis direction. Each of the second micro lenses of the second array corresponds to one of the first micro lenses. Each of the second micro lenses is arranged to receive illumination from one of the first micro lenses. The first micro lenses produce a non-overlapped near field image in the slow axis direction.

26 Claims, 4 Drawing Sheets

ILLUMINATION SYSTEM FOR USE IN IMAGING SYSTEMS

BACKGROUND OF THE INVENTION

The invention relates generally to imaging systems, and particularly relates to illumination systems for use in imaging systems.

Conventional imaging systems typically include an illumination system for generating a field of illumination, and an optical assembly for applying the field of illumination in a modulated form to an imaging surface. Such illumination systems may provide a line of laser illumination so that a line of picture elements (or pixels) may be imaged at a time for efficiency in imaging. The field of illumination may be modulated by selectively controlling the illumination system (e.g., as disclosed in U.S. Pat. No. 4,804,975), or by using a light modulator for selectively modulating the field of illumination. Illumination systems that modulate the illumination field generally require that relatively high powers be switched on and off at fairly high speeds. This may be relatively expensive and difficult to use to achieve high quality and/or high resolution imaging. It is desirable, therefore, that light modulators be used in certain applications. The use of light modulators permits the illumination system to provide a relatively uniform field of illumination. This allows the laser emitters to exhibit relatively uniform power consumption and be maintained at a relatively uniform temperature, which also contributes to uniformity of the illumination field.

Illuminations systems for providing uniform fields of high power illumination typically include an array of laser diode emitters and a variety of optical elements that are positioned to adjust the size and uniformity of the field of illumination, and to direct the illumination field to a light modulator. U.S. Pat. No. 4,786,918, for example, discloses a laser diode array that includes a plurality of spatially disposed laser emitters that may be used for printing with a laser line modulator. A light modulator for conventional systems may either transmit the modulated illumination field through the light modulator toward the imaging surface (e.g., as disclosed in U.S. Pat. No. 5,521,748), or may reflect the modulated illumination field toward the imaging surface (e.g., as also disclosed in U.S. Pat. No. 5,521,748 as well as U.S. Pat. Nos. 5,132,723 and 5,049,901).

Conventional imaging systems that include a light modulator typically focus the near field image of the light source onto the light modulator. For example, the systems disclosed in U.S. Pat. No. 5,521,748 each provide that the near field image of the light source is focused in the slow axis direction onto the light modulator by imaging optics. Near field imaging onto the modulator, however, requires that the physical arrangement of the light source, the imaging lenses and the modulator be very accurately positioned to ensure that the focal point for the light from each of the emitters be located on the modulator. If the focal point is not located on the light modulator, then the quality of the image may be comprised. Also, if the focal length is rather short, then divergence becomes a significant concern, since divergence is inversely related to the focal length of a lens. Moreover, small variations in the arrangement and/or power of the various emitters vis-à-vis each other may result in significant variations in the light field imaged onto the modulator.

Illumination systems as disclosed in U.S. Pat. No. 5,521,748 include an array of emitters and an array of lenslets located adjacent the emitters such that specific portions of the light modulator are each illuminated by a specific emitter and its associated lenslet. Such illumination systems may provide non-uniform illumination fields on the light modulator due, at least in part, to variations among emitter characteristics and/or any overlap of illumination portions at the modulator that may occur in an effort to ensure complete coverage of the modulator.

As discussed in U.S. Pat. No. 5,900,981 a type of non-uniformity in an illumination field that may result from the use of a laser diode elements is the smile effect in which the center portion of the illumination line sags, missing the active portion of the modulator. The systems disclosed in U.S. Pat. No. 5,900,981 is disclosed to utilize natural aberrations and/or artificial aberrations for the stated purpose of decreasing the sensitivity of the optical system to the smile phenomenon. The systems of U.S. Pat. No. 5,900,981, however, also provide that the near field image of the light source is focused in the slow axis direction onto the light modulator by imaging optics. Such systems may suffer from many of the shortcomings discussed above. Near field imaging, for example, does not permit the imaging system to be telecentric in the slow axis, allowing the distance between slow axis optical elements to be changed without affecting illumination quality. Telecentricity occurs when rays are normal to an incident surface.

Illumination systems for use in thermal imaging systems in which a thermal recording medium is imaged, typically require greater power than that required in light sensitive imaging systems, since at least a portion of the recording medium must be thermally ablated during imaging. If the illumination source is comprised of a plurality of laser diodes, thermal imaging systems generally require that the fill factor (width of each emitter/spacing of the emitters) be increased. Increasing the fill factor, however, generally causes divergence to increase as well. Divergence relates to the widening of a light field as it travels away from a source.

It is an object of the present invention to efficiently provide an illumination system for imaging systems that efficiently produces a uniform illumination area at a light modulator.

It is another object of the present invention to provide such an illumination system that exhibits minimal illumination divergence.

It is a further object of the present invention to provide such an illumination system that exhibits telecentricity to facilitate magnification and/or focusing adjustments during use.

It is also an object of the present invention to provide an illumination system with a relatively high fill factor, yet relatively low divergence.

It is also an object of the present invention to provide an illumination system that achieves the benefits of near field imaging (e.g., magnification) and far field imaging (e.g., less divergence) in one system.

SUMMARY OF THE INVENTION

The invention provides an improved illumination system for use in imaging systems that may produce a non-overlapped near field image in the slow axis direction, and a far field image of the illumination source in the slow axis direction at a light modulator. In an embodiment, the illumination system produces an area of illumination for a light modulator along a slow axis direction and along a fast axis direction, and includes a plurality of laser diode emitters, a first array of first micro lenses, and a second array of second micro lenses. The plurality of laser diode emitters are arranged in an array, and each of the laser diode emitters produces illumination in a slow axis direction and in a fast axis direction. Each first micro lens in the first array corresponds to one of the laser diode emitters, and collimates illumination in the slow axis direction. Each of the second micro lenses in the second array corresponds to one of the first micro lenses. Each of the second micro lenses is arranged to receive illumination from one of the first micro lenses. The first micro lenses produce a non-overlapped near field image in the slow axis direction.

BRIEF DESCRIPTION OF THE DRAWINGS

The following description may be further understood with reference to the accompanying drawings in which.

The drawings are shown for illustrative purposes only, and are not to scale.

DETAILED DESCRIPTION OF THE INVENTION

Figure 1:
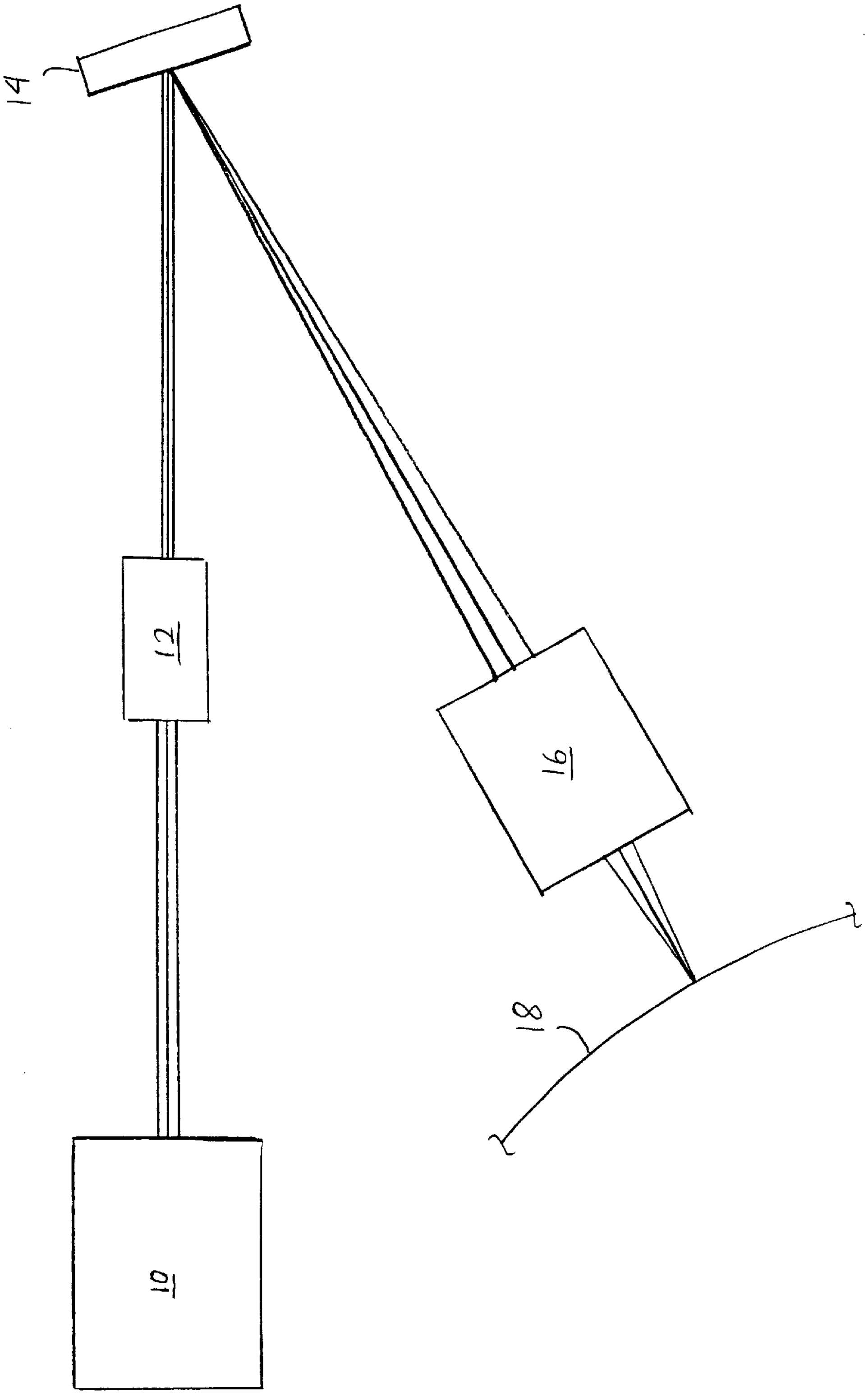
FIG. 1 shows an illustrative functional diagram of an imaging system including an illumination system of the invention.

As shown in FIG. 1, an embodiment of an imaging system incorporating an illumination system of the invention includes an illumination source 10 such as an array of laser emitters and associated optics, a field lens system 12 including one or more field lenses, a light modulator 14, imaging optics 16, and an imaging drum for supporting a recording medium 18. Generally, the illumination field is selectively focused onto the thermal recording medium to produce a desired image. The recording medium includes a protective coating that prevents the film from being imaged when exposed to light. The light protected recording medium may be selectively thermally ablated for printing in accordance with thermal printing techniques.

Figure 2:
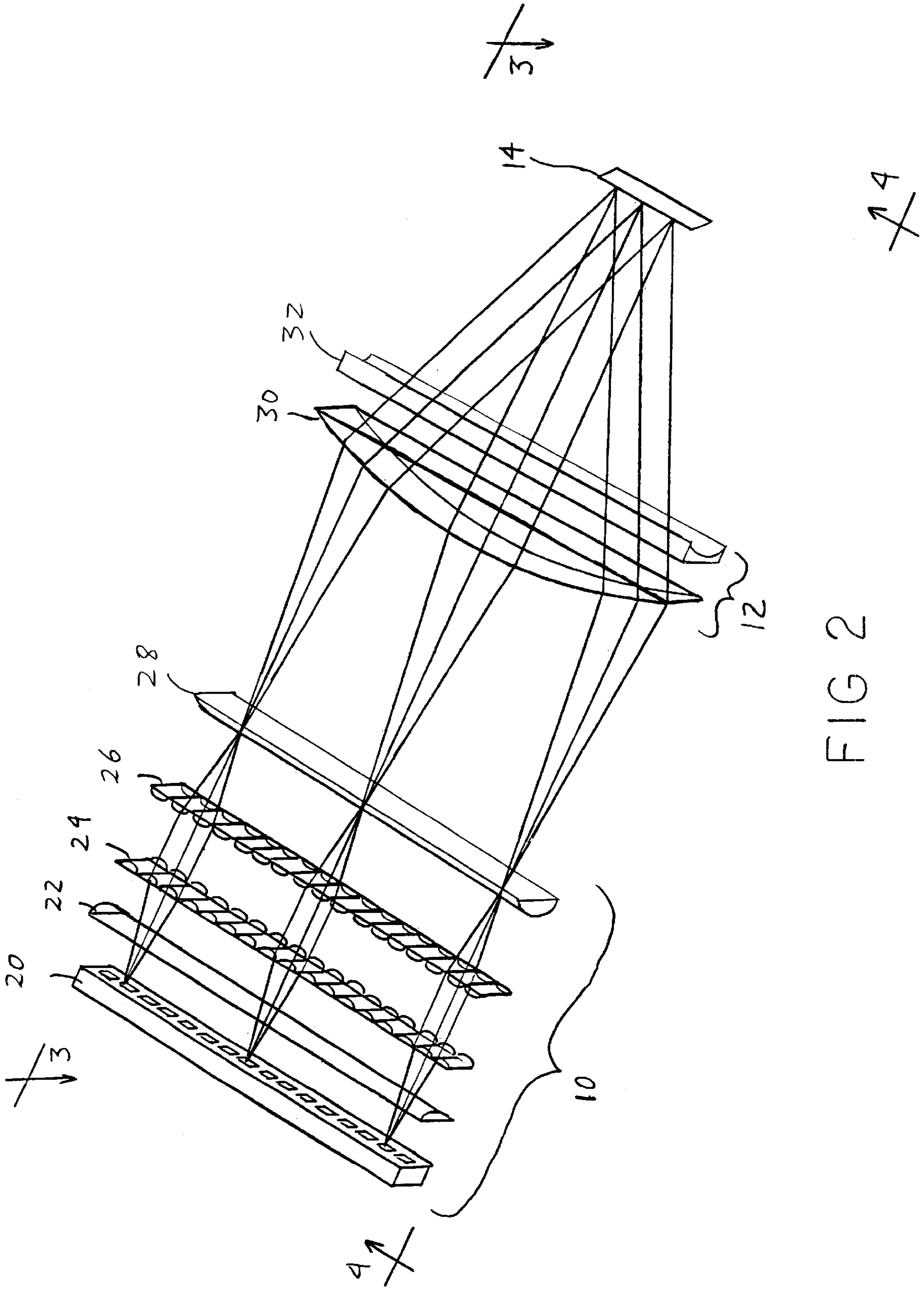
FIG. 2 shows an illustrative isometric diagram of an illumination system of the invention.

The illumination source 10 generates and emits a line of continuous wave energy. The light modulator 14 shown in FIG. 2 is reflective, and in a preferred embodiment comprises a reflective grating light valve (GLV). The zero order diffraction of the illumination field from the GLV is imaged onto the thermal recording medium by the imaging optics 16. The higher order diffraction images may be blocked by appropriate optical devices (not shown). The imaging optics 16 transfer the image from the GLV to the recording medium.

Figure 3:
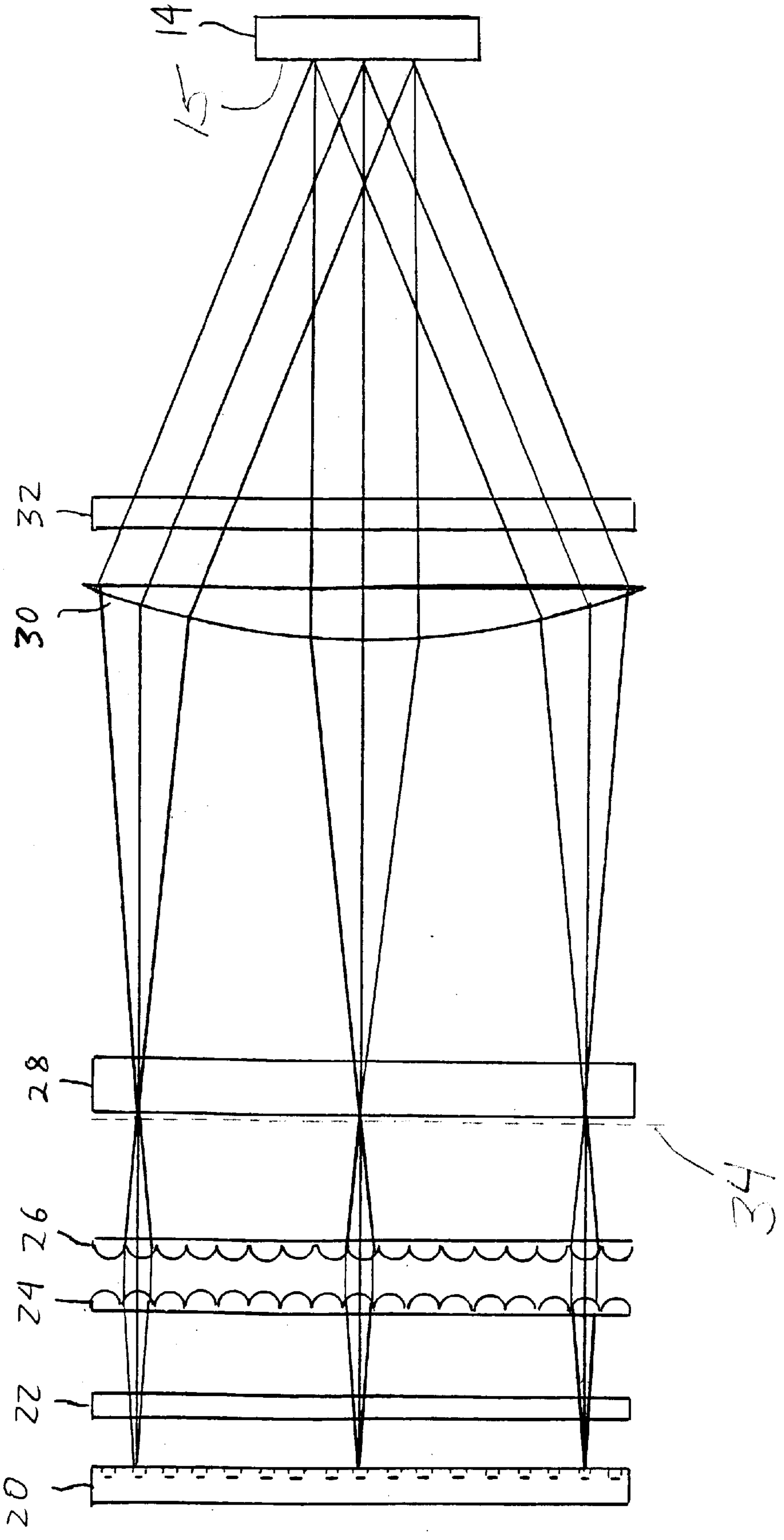
FIG. 3 shows an illustrative view of the slow axis direction of the system of FIG. 2 taken along line 3—3 thereof.

As shown in FIG. 2, the illumination source 10 of an embodiment of the invention includes an array of laser diode emitters 20, a fast axis collimating lens 22, a first array of microlenses 24, a second array of microlenses 26, and a fast axis narrowing lens 28. The curved surfaces of the microlenses 24 are oriented to face the curved surfaces of the microlenses 26 along the optical paths of the microlenses as shown in FIGS. 2 and 3. The array of laser diodes emitters 20 may include, for example, emitters that each provide an illumination area of 1 micron by 200 microns, and are spaced at intervals of 400 microns along the array 20. The field lens system 12 of the embodiment of FIG. 2 includes slow axis collimating lens 30, and a fast axis collimating lens 32.

As further shown in FIG. 3, in the slow axis direction, light from each emitter passes through the fast axis collimating lens 22, and is collimated in the slow axis direction by a respective microlens in the first array of first microlenses 24. The collimated light from each microlens in the first array is then focused by a respective microlens in the second array of second microlenses 26, the focal point of which lies on a near field image plane 34. The near field image plane 34 is comprised of portions of illumination from the emitters in the array 20 that are not overlapped in the slow axis direction. The magnification of the double microlens array may in an embodiment be specified as the inverse of the fill factor (FF) of the emitters, i.e., 1/FF.

The near field image then passes through a fast axis narrowing lens 28 to the slow axis collimating lens 30, which collimates the illumination in the slow axis direction in formation of the far field image along the surface 15 of the light modulator 14. The illumination passes through the fast axis collimating lens 32 unaffected in the slow axis direction. The illumination system, therefore, provides in the slow axis direction, a non-overlapped near field image that is focused at an image plane 34, and a collimated far field image at the light modulator. Illumination, therefore, that originates from each emitter is spread across the entire light modulator 14 in the slow axis direction in the formation of the far field image. This improves beam uniformity and reduces divergence.

The slow axis divergence of the illustrated system may be described as:

$$\Theta_s = A_s * (L_b / L_l) * FF,$$

where $A_s$ is the slow axis deviance of the laser diode emitters, $L_b$ is the length of the bar of laser diode emitters, and $L_l$ is the length of illumination line on the modulator. This divergence is relatively small, while the depth of focus is relatively large. Beam uniformity is improved because the illumination associated with each emitter is not overlapped with illumination from other emitters at the near field image located along image plane 34.

Figure 4:
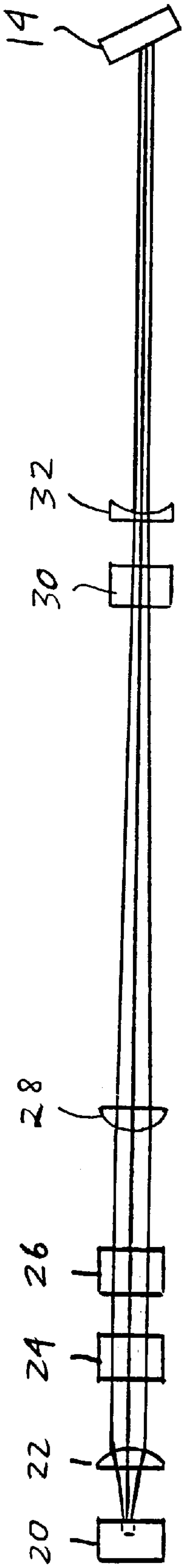
FIG. 4 shows an illustrative view of the fast axis direction of the system of FIG. 2 taken along line 4—4 thereof.

As shown in FIG. 4, in the fast axis direction, light from the emitters 20 is collimated in the fast axis direction to reduce divergence by the fast axis collimating lens 22. The illumination then passes through the microlens arrays 24 and 26 unaffected in the fast axis direction, and then is narrowed in the fast axis direction by the fast axis narrowing lens 28. The illumination then passes through the slow axis collimating lens 30 (unaffected in the fast axis direction) and is collimated in the fast axis direction by the fast axis collimating lens 32. In the fast axis direction, therefore, the system provides a collimated far field image at the light modulator. Illumination from the emitters is spread across the entire light modulator in the fast axis direction.

The slow axis direction corresponds to the movement of the optical head along the longitudinal axis of an imaging drum which parallels the linear direction along the width (W) of the medium 18, whereas the fast axis direction corresponds to the spinning of a laser beam along the radial direction of the drum, e.g., along a swath of the medium 18.

The medium 18, shown in FIG. 1, is positioned as supported on an external drum (not shown). A line of illumination (also referred to as a line of radiation), is coincident with the medium 18 at the image plane, and has a length (L) and a width (Z). Each line of illumination contains a predetermined number of sections that respectively correspond to a number of pixels on the GLV 14. The line of illumination is imaged at an initial position along a first swath (N) on the sheet of medium 18. As the drum rotates, pixels along the line of illumination are turned ON or OFF according to image information supplied by control electronics as well known in the art. Modulation of pixels is synchronized to the rotational speed of the drum. This procedure continues until imaging is complete on swath (N). The movement of the line of illumination from swath (N) to (N+1) is facilitated by movement of the imaging head along the longitudinal axis (i.e., the slow axis) of the rotating drum. The above-described imaging procedure is then repeated for swath (N+1) and all additional swaths until the image is completely transferred onto the medium 18. The imaging procedure may also be accomplished by other means such as a spiral scan of the media as well known in the art.

The GLV operates by diffracting light with the use of moveable ribbons in an array. For the present invention, energy from the GLV reaches the image plane when a GLV pixel is not activated. When a pixel is fully activated, i.e., when alternate ribbons are deflected approximately one-quarter wavelength, then light is diffracted and subsequently blocked from reaching the image plane. Pixels may be partially activated to control the amount of light reaching the image plane.

One exemplary GLV consists of 1088 individually addressable pixels. In the preferred embodiment a one-dimensional GLV array is used, although a multi-dimensional GLV could be used if desired to create an wider area of illumination rather than a line of illumination.

Various imaging resolutions are available by changing the grouping of the GLV pixels. Moreover, all pixels of the GLV need not necessarily be used in the formation of an image. For example, if 720 GLV pixels are imaged two-to-one at the image plane to produce a resolution of 2400 dpi image pixels (i.e., writing dots) per inch, then a grouping of two GLV pixels per image plane pixel results in 360 writing dots at a resolution of 2400 dots per inch. If a resolution of 1200 dpi is desired, the 720 GLV pixels should be imaged four-to-one at the image plane, resulting in 180 writing dots per inch.

No additional moving parts are required to change spot size (i.e., the writing dots or image pixels) other than to select the number of GLV pixels for the desired resolution. Moreover, with constant illumination of the GLV, the energy at the image plane remains constant in terms of energy per unit area, thereby requiring no exposure energy changes with change in resolution. This provides a benefit over systems using optical demagnification to change addressability. With optical demagnification, the power in the imaging spot must be reduced e.g., by a power of 2, to the change in spot size causing more power to be discarded and slowing down the system by the same proportion. In the preferred system, throughput remains constant as the power is spread over proportionally more pixels. Other combinations of ribbons can be selected on the GLV with the appropriate demagnification selection. In each case the time of activation of each pixel is varied directly with the resolution selected while the scanning velocity remains constant.

The surface of the grating light valve includes a diffraction grating, e.g., an array of narrow parallel slits or openings which, when white light is projected therethrough, breaks down the white light into all the colors of the spectrum due to the diffraction of light waves as they pass through the openings. The diffraction grating produces this spectral effect due to the reinforcement of the light waves from adjacent slits or openings.

The fact that individual GLV pixels may be actuated to different levels of diffraction efficiency can be used to great advantage. A first possible use is to equalize the energy distribution across the GLV. If a nominal energy level is set below the maximum, then individual pixels can be adjusted either up or down to cause all pixels to be equal. A second use is to desensitize the effects of pixel placement errors at the boundary between bands of multiple pixels. The pixels located at the boundary between the swaths of multiple pixels can be lowered in intensity and overlapped so as to average the effective position.

There are other advantages of using the above-described GLV in an imaging system. For example, manufacture of the GLV is cost effective compared with manufacture of other light modulators since the fabrication of the GLV uses standard fabrication methods employed in the semiconductor industry. Also, the pixels of the GLV are accurately located to tight semiconductor standards. The GLV is capable of modulating high power levels of radiation. Moreover, the reflective GLV results in a more compact system as compared to an in-line multiple beam system. A transmissive modulator could be used to replace the GLV, but one of the trade-offs would be a physically larger system. Due to the scale and materials employed, the GLV is inherently insensitive to damage from shock and vibration. The GLV is also sealed and insignificantly stressed in use, resulting in high reliability. Due to the fact that the GLV pixels can be pulled down to different levels, the GLV can be used with different wavelength sources. The GLV can also be used with both multi-mode and single mode lasers. Further, as compared to single beam methods of writing images, the adjacency of the pixels produced by the GLV reduces the power required to write equivalent images.

Due to the fact that a large number of pixels is used to create the GLV, it is possible to advantageously employ some number of pixels for uses other than as writing beams without incurring a penalty. These other uses include sourcing beams (1) to detect the edge of a plate so as to synchronize the image location with the position of the recording medium, or (2) to sense or to automatically adjust the focus of an imaging system.

The zero order diffracted light reflected from the object plane of the GLV passes through a first lens group and is directed to, and then passes through, an aperture. The first lens group may include at least one fixed lens and at least one adjustable lens for adjusting the image magnification independent of the image focus. The aperture is a single centrally located opening (preferably having an elliptical shape) on the stop. The stop blocks non-zero order diffractive rays while allowing zero order diffractive rays to pass through the aperture.

The principal rays of zero order radiation received from the first lens group are focused in the center of the aperture, and passed to a second lens group. The second lens group includes one or more lenses for adjusting the image focus independent of the image magnification. The second lens group must contain at least one adjustable lens, and could contain zero, one or more fixed lenses. From the second lens group, the rays are focused along a line of radiation on the imaging medium.

One could alter the above embodiment to write using first order diffractive rays while blocking zero order diffractive rays. Similarly, the system could be designed to operate with either even or odd order diffractive light. Also variable is the ratio of pixels in the GLV to pixels on the image plane. In the preferred embodiment, each pixel on the image plane corresponds to two GLV pixels.

An imaging system of the invention may also include a first magnification lens group, a stop containing an aperture, and a second focusing lens group. The grating light valve of the present embodiment allows each pixel to be separately and individually controlled in accordance with signals from control electronics built into the GLV modulator. In other words, individual image pixels may be separately diffracted. Furthermore, the intensity of each GLV pixel may be electronically controlled by varying the voltage applied to the ribbons, thus controlling their deflection and ultimately the amount of energy that reaches the image plane. Varying the intensity of GLV pixels on the GLV object plane may correct non-uniformity of the line of illumination on the image plane.

The invention provides for an imaging system that exhibits dual telecentricity. Telecentricity occurs when rays are normal to an incident surface. The benefit of having an imaging system with dual telecentricity is to separate diffractive orders and separate magnification adjustments from focusing adjustments. With a dual telecentric arrangement, magnification of the system is insensitive to movements of the GLV or imaging medium 18. Either magnification or focus, therefore, may be adjusted independent of one another.

An optical imaging system including an illumination system of the invention is preferably used with an external drum imagesetter or platesetter, so that the image is transferred onto a medium supported by the external surface of the drum. The illumination system of the invention could also be used in direct-to-press imaging to project the line of illumination directly onto a plate cylinder of a printing press. In this case, the imaging system would be replicated at each station of the printing press. Furthermore, while the head is most appropriately used in the above-described applications, it may also be used in an internal drum or capstan style imagesetter or platesetter.

Those skilled in the art will appreciate that numerous modifications and variations may be made to the above disclosed embodiments without departing from the spirit and scope of the present invention.

What is claimed is:

1. An illumination system for use in imaging systems, said illumination system for producing an area of illumination for a light modulator along a slow axis direction and a fast axis direction, said illumination system comprising:

a plurality of laser diode emitters arranged in an array, each of said laser diode emitters for producing illumination in a slow axis direction and in a fast axis direction;

a first array of first microlenses, each of said first microlenses corresponding to one of said laser diode emitters, and for collimating illumination in the slow axis direction;

a second array of second microlenses, each of said second microlenses corresponding to one of said first microlenses and each being arranged to receive illumination from one of said first microlenses, said first microlenses for producing a non-overlapped near field image in the slow axis direction; and a slow axis collimating lens for collimating illumination in the slow axis direction in the formation of a far field image in the slow axis direction on a light modulator.

2. The illumination system as claimed in claim 1, wherein said illumination system further includes a fast axis collimating lens positioned to receive light from each of said laser diode emitters, said fast axis collimating lens for reducing divergence in the fast axis direction.

3. The illumination system as claimed in claim 1, wherein said illumination system further includes a fast axis narrowing lens for narrowing the illumination field in the fast axis direction.

4. The illumination system as claimed in claim 1, wherein a far field image is formed on the light modulator in both the slow axis direction and the fast axis direction.

5. The illumination system as claimed in claim 4, wherein said illumination system further includes a fast axis collimating lens for collimating illumination in the fast axis direction.

6. The illumination system as claimed in claim 4, wherein the far field image is formed on a grating light valve.

7. The illumination system as claimed in claim 1, wherein said first microlenses include curved lens surfaces that face curved lens surfaces of said second microlenses.

8. An illumination system for use in imaging systems, said illumination system for producing an area of illumination at a light modulator along a slow axis direction and a fast axis direction, said illumination system comprising:

a plurality of laser diode emitters arranged in an array, each of said laser diode emitters for producing illumination in the slow axis direction and in the fast axis direction;

a first lens assembly for producing a near field image in the slow axis direction, said near field image being comprised of non-overlapped portions of illumination associated with respective laser diode emitters, said first lens assembly including a pair of microlens arrays that are sequentially positioned along an optical axis of said first lens assembly; and a second lens assembly for collimating illumination from said first lens assembly, and for producing at a light modulator a far field image that is collimated in the slow axis direction.

9. The illumination system as claimed in claim 8, wherein said pair of microlens arrays includes a first array of first microlenses, each of which corresponds to one of the laser diode emitters.

10. The illumination system as claimed in claim 9, wherein said first microlenses collimate illumination in the slow axis direction.

11. The illumination system as claimed in claim 9, wherein said pair of microlenses includes a second array of second microlenses, each of which corresponds to one of the laser diode emitters.

12. The illumination system as claimed in claim 11, wherein said second microlenses focus light in the slow axis direction in the formation of a near field image.

13. The illumination system as claimed in claim 11, wherein said first microlenses include curved lens surfaces that face curved lens surfaces of said second microlenses.

14. The illumination system as claimed in claim 8, wherein said second lens assembly includes a fast axis collimating lens for collimating illumination in the fast axis direction.

15. The illumination system as claimed in claim 14, wherein said illumination system includes a fast axis narrowing lens for narrowing a near field image of illumination.

16. The illumination system as claimed in claim 8, wherein said illumination system further includes a fast axis collimating lens for collimating illumination from said plurality of laser diode emitters.

17. The illumination system as claimed in claim 8, wherein illumination originating from each emitter is spread across the entire image of the far field illumination in the slow axis direction.

18. The illumination system as claimed in claim 8, wherein illumination originating from each of said laser diode emitters is spread across the light modulator in the slow axis direction in forming the far field image.

19. The illumination system as claimed in claim 8, wherein said second lens assembly includes a slow axis collimating lens for collimating illumination in the slow axis direction.

20. A method of emitting illumination in an imaging system for producing an area of illumination at a light modulator along a slow axis direction and along a fast axis direction, said method comprising the steps of:

collimating illumination in the slow axis direction;

focusing the collimated illumination in the slow axis direction in the formation of a near field image in the slow axis direction; and collimating illumination from the near field image in the slow axis direction to produce a far field image that is collimated in the slow axis direction at a light modulator.

21. The method as claimed in claim 20, wherein said method further includes the step of collimated illumination in the fast axis direction to reduce divergence in the fast axis direction.

22. The method as claimed in claim 20, wherein said method further includes the step of collimating illumination from the near field image in the fast axis direction to produce a far field image that is collimated in the fast axis direction.

23. The method as claimed in claim 20, wherein said near field image is formed of non-overlapping portions corresponding to each emitter.

24. The method as claimed in claim 20, wherein illumination associated with each emitter is spread over the entire far field image in the slow axis direction in the formation of the far field image.

25. An illumination system for use in imaging systems, said illumination system for producing an area of illumination for a light modulator along a slow axis direction and a fast axis direction, said illumination system comprising:

a plurality of laser diode emitters arranged in an array, each of said laser diode emitters for producing illumination in a slow axis direction and in a fast axis direction;

a first array of first microlenses, each of said first microlenses corresponding to one of said laser diode emitters, and for collimating illumination in the slow axis direction;

a second array of second microlenses, each of said second microlenses corresponding to one of said first microlenses and each being arranged to receive illumination from one of said first microlenses, said first microlenses for producing a non-overlapped near field image in the slow axis direction;

a fast axis narrowing lens for narrowing the illumination field in the fast axis direction;

a slow axis collimating lens for collimating illumination in the slow axis direction in the formation of a far field image in the slow axis direction on a light modulator; and a fast axis collimating lens positioned to receive light from each of said laser diode emitters, said fast axis collimating lens for reducing divergence in the fast axis direction in the formation of a far field image on the light modulator in the fast axis direction.

26. The illumination system as claimed in claim 25, wherein said first microlenses include curved lens surfaces that face curved lens surfaces of said second microlenses.

* * * * *